US011535103B2

(12) United States Patent
Chen et al.

(10) Patent No.: US 11,535,103 B2
(45) Date of Patent: Dec. 27, 2022

(54) LENSLESS INSTRUMENT CLUSTER WITH INTEGRATION OF HARD TELLTALES AND HALO LIGHTING PROVIDING A SEAMLESS DISPLAY APPEARANCE

(71) Applicant: N. S. International Ltd., Troy, MI (US)

(72) Inventors: Diyu Chen, Wixom, MI (US); Shrutika Sawardekar, Auburn Hills, MI (US); Anshuman Mittal, Troy, MI (US); Arul Krishna, West Bloomfield, MI (US)

(73) Assignee: N. S. International Ltd., Troy, MI (US)

( * ) Notice: Subject to any disclaimer, the term of this patent is extended or adjusted under 35 U.S.C. 154(b) by 0 days.

(21) Appl. No.: 17/350,868

(22) Filed: Jun. 17, 2021

(65) Prior Publication Data

US 2021/0394615 A1    Dec. 23, 2021

Related U.S. Application Data

(63) Continuation-in-part of application No. 17/120,791, filed on Dec. 14, 2020, now Pat. No. 11,046,185.
(Continued)

(51) Int. Cl.
*B60K 35/00* (2006.01)

(52) U.S. Cl.
CPC ........ *B60K 35/00* (2013.01); *B60K 2370/332* (2019.05); *B60K 2370/336* (2019.05);
(Continued)

(58) Field of Classification Search
CPC ............................ B60K 2370/33; B60K 37/02
See application file for complete search history.

(56) References Cited

U.S. PATENT DOCUMENTS 5,406,303 A    4/1995 Salmon et al.
6,409,355 B1    6/2002 Simon et al.
(Continued)

FOREIGN PATENT DOCUMENTS

CN    305060052    3/2019
CN    305376223    10/2019
(Continued)

OTHER PUBLICATIONS

2020 Mustang Technology, The brains behind the beauty, https://www.ford.com/cars/mustang/features/technology/.
(Continued)

*Primary Examiner* — Andrew J Coughlin
(74) *Attorney, Agent, or Firm* — Clark Hill PLC (57) ABSTRACT

The invention is a robust lensless instrument cluster configured for installation in a vehicle. The instrument cluster comprises an outer case, a PCB and lighting structure, an inner frame, an optical bonding assembly, halo lighting portions, a seamless display comprising tell-tale indicators and gauges, and an outer visor. The instrument cluster further comprises a plurality of LEDs for compartmentalized and indirect lighting of the tell-tale indicators on the seamless display and the halo lighting portions around the edges of the seamless display. Because the instrument cluster is lensless and otherwise exposed to the environment, it comprises a seal system to prevent the ingress of water and dust into the interior components. The seal system can also eliminate the risk of mura in the optical bonding assembly.

20 Claims, 10 Drawing Sheets

Related U.S. Application Data (60) Provisional application No. 63/040,242, filed on Jun. 17, 2020.

(52) U.S. Cl.
    CPC ...... *B60K 2370/34* (2019.05); *B60K 2370/42* (2019.05); *B60K 2370/691* (2019.05)

(56) References Cited

U.S. PATENT DOCUMENTS

| | | |
|---|---|---|
| 7,642,901 B2 | 1/2010 | Kato et al. |
| 7,671,859 B2 | 3/2010 | Birman et al. |
| 8,089,351 B2 | 1/2012 | Eich et al. |
| 8,562,159 B2 | 10/2013 | Manivannan et al. |
| 9,358,923 B2 | 6/2016 | Henon et al. |
| 9,360,350 B2 | 6/2016 | Olila et al. |
| 9,463,694 B1 | 10/2016 | Clark et al. |
| 9,523,593 B2 | 12/2016 | Kunitachi et al. |
| 9,776,561 B2 | 10/2017 | Ito et al. |
| 10,112,532 B2 | 10/2018 | Mittal et al. |
| 10,227,007 B1 | 3/2019 | Wagle et al. |
| 10,859,414 B2 | 12/2020 | Xu et al. |
| 2004/0189483 A1 | 9/2004 | Stringfellow |
| 2006/0120062 A1 | 6/2006 | Wu |
| 2006/0290486 A1 | 12/2006 | Sumiya et al. |
| 2008/0219018 A1 | 9/2008 | Eich |
| 2010/0033311 A1 | 2/2010 | Tominaga |
| 2017/0057356 A1 | 3/2017 | Krier et al. |

FOREIGN PATENT DOCUMENTS

| | | |
|---|---|---|
| CN | 305407481 | 10/2019 |
| CN | 305503822 | 12/2019 |
| JP | 8207659 | 8/1996 |
| JP | D1119802 | 8/2001 |
| JP | 2012198130 | 10/2012 |
| WO | 2006018423 | 2/2006 |
| WO | 2007022202 | 2/2007 |

OTHER PUBLICATIONS

Ross, Jeffrey N., Chevy gives guided tour of configurable Corvette Stingray gauge cluster, Verizon Media, https://www.autoblog.com/2013/08/12/chevy-corvette-stingray-gauge-cluster-video/, 2013.
International Search Report and Written Opinion for PCT/US2021/037891 dated Jul. 9, 2021.

LENSLESS INSTRUMENT CLUSTER WITH INTEGRATION OF HARD TELLTALES AND HALO LIGHTING PROVIDING A SEAMLESS DISPLAY APPEARANCE

CROSS REFERENCE TO RELATED APPLICATIONS

This application claims the benefit of U.S. Provisional Patent Application No. 63/040,242 filed on Jun. 17, 2020 and U.S. Utility patent application Ser. No. 17/120,791 filed on Dec. 14, 2020.

FIELD OF THE INVENTION

The present invention relates to instrument clusters in vehicles.

BACKGROUND OF THE INVENTION

A typical vehicle includes an instrument cluster that is provided in front of the driver. Typically, an instrument cluster includes various gauges and separate warning indicators which are meant to provide important information to the driver regarding the current status of the vehicle. Examples of gauges included in an instrument cluster comprise a speedometer and a tachometer, while examples of warning indicators included in an instrument cluster comprise a check engine light, an oil light, and a tire pressure light.

Warning indicators are often called "tell-tale" ("TT") indicators. Unlike gauges which can be difficult to read and understand, TTs are either on or off. When a TT is on, it is a tell-tale sign to the driver that something, depending on which TT is on, is wrong with the vehicle or otherwise requires attention. While it may be difficult for some drivers to appreciate that there is a problem with the vehicle by looking at gauges of an instrument cluster, TT lights are easy to detect when they illuminate.

Instrument clusters include lights and electronics. As such, instrument clusters are typically provided behind a lens which shields and protects the instrument cluster from, for example, water, dust, and scratching. While providing a lens in front of an instrument cluster provides much needed protection, such a design is not as modern in appearance compared to a design which omits a lens (i.e., a "lens-less" design). However, providing an instrument cluster without a lens is not feasible due to the instrument panel including lights and electronics, and omitting the lens results in the instrument cluster being exposed to, for example, water, dust, and scratching that can adversely affect the operation and/or appearance of the instrument cluster. Lenses not only protect the instrument cluster from, for example, water, dust, and scratching, but are also provided as being curved structures, thereby providing anti-glare/anti-reflection properties.

Modern vehicles have ambient lighting on the inside of the vehicle which can be adjusted. Most vehicles that include ambient lighting are designed such that the ambient lighting can be dimmed, and/or the color of the lighting can be changed depending on the preference of the driver. Such ambient lighting is not typically provided along the sides of the instrument cluster.

SUMMARY OF THE DISCLOSURE

An embodiment of the present invention comprises an instrument cluster preferably for a vehicle, where the instrument cluster is lens-less, robust, provides a large "seamless" display (seamless meaning a main, central display blends, appearance-wise, with adjacent TTs), and includes highway assist halo lighting, preferably in the form of multiple color halo lighting, along the sides of the instrument cluster. The instrument cluster also encompasses a structural design that can provide a stable display performance under different driving conditions.

Additionally, because the instrument cluster is lensless and exposed to the environment in which it is installed, the cluster further comprises a seal system to prevent the ingress of water and dust into the instrument cluster, particularly a printed circuit board and lighting structure provided therein. The present invention also resolves the problem of "black-mura" found in prior art thin-film-transistor ("TFT") devices, wherein pressure absorbing packing foam is strategically positioned between an in mold decorative lens or layer and an inner case of the instrument cluster.

A preferred embodiment of the present invention comprises:
a lensless instrument cluster configured for installation in a user environment, the lensless instrument cluster comprising:
an outer case;
a printed circuit board and lighting structure assembly connected to the outer case;
an inner frame connected to the printed circuit board and lighting structure assembly;
an optical bonding assembly connected to the inner frame;
a halo lighting portion; and
a seamless display comprising:
a main display portion comprising a gauge;
a tell-tale surface comprising a tell-tale indicator; and
an outermost surface that is in direct contact with the user environment.

A second preferred embodiment of the present invention comprises:
an outer case comprising a heat sink;
a printed circuit board and lighting structure assembly connected to the outer case and comprising:
a first light emitting diode configured to illuminate a tell-tale indicator;
a second light emitting diode configured to illuminate a halo lighting portion;
an inner frame connected to the printed circuit board and lighting structure assembly;
an optical bonding assembly connected to the inner frame and comprising:
a thin-film-transistor;
an in mold decorative layer; and
packing material;
the halo lighting portion; and
a seamless display comprising:
a main display portion; and
a tell-tale surface.

DETAILED DESCRIPTION OF AN EMBODIMENT OF THE INVENTION

While the present invention may be susceptible to embodiment in different forms, there is described herein in detail, a specific embodiment with the understanding that the present disclosure is to be considered an exemplification of the principles of the invention, and is not intended to limit the invention to that described herein.

Figure 1:
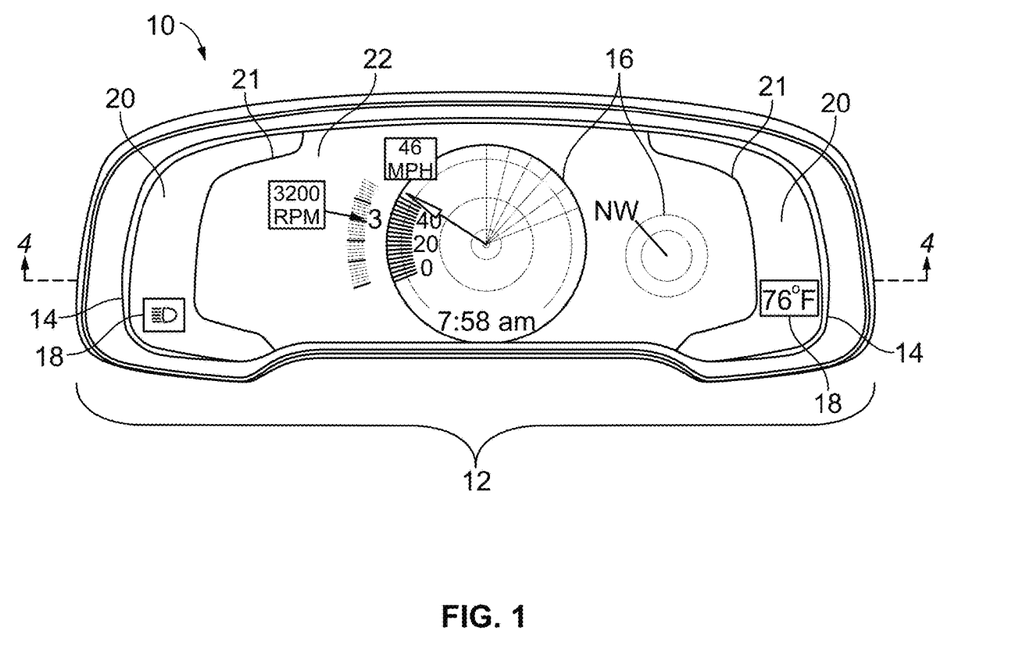
FIG. 1 is a front view of an instrument cluster which is in accordance with an embodiment of the present invention.

FIG. 1 is a front view of an instrument cluster 10 which is in accordance with an embodiment of the present invention. The instrument cluster 10 is lens-less, robust, provides a large seamless display 12 having an outermost surface, and includes ambient lighting, preferably in the form of adjustable color halo lighting portion 14 along the sides of the instrument cluster 10. As shown in FIG. 1, the instrument cluster 10 preferably displays one or more gauges or meters 16, and includes tell-tale indicators (TTs) 18 that may or may not illuminate depending on the current state of the vehicle. Examples of TTs 18 include but are not limited to turn signal symbols, check engine symbols, and high beam symbols. The gauges 16 and the TTs 18, collectively, appear (to the driver) to all be part of the large, seamless display 12. Preferably, the instrument cluster 10 comprises tell-tale surface 20 (and also in-mold decorating ("IMD") surface 58) through which the TTs 18 are viewed to provide a seamless stylish, floating look, i.e., compared to a main display section or portion 22 that provides the gauges or meters 16. As shown in FIG. 1, borders 21 are shown to delineate tell-tale surface 20 from main display portion 22, whereas in practice the borders 21 are preferably imperceptible to a user. This is a feature of the "seamless" display 12. In preferred embodiments, the TTs 18 are impregnated on surface 58 (see FIGS. 4-7, 9). As will be appreciated by those of skill in the art, the orientation, size, color, format, and type of gauges 16 and TTs 18 displayed by the cluster 10 may vary.

The instrument cluster 10, when fully assembled and installed in a vehicle, preferably provides structural integrity, specifically dynamic performance regarding, for example, mechanical shock and vibration with thermal shock. The instrument cluster 10 is also preferably configured to resist the entry of water and dust, as will be described in more detail later hereinbelow.

Figure 2:
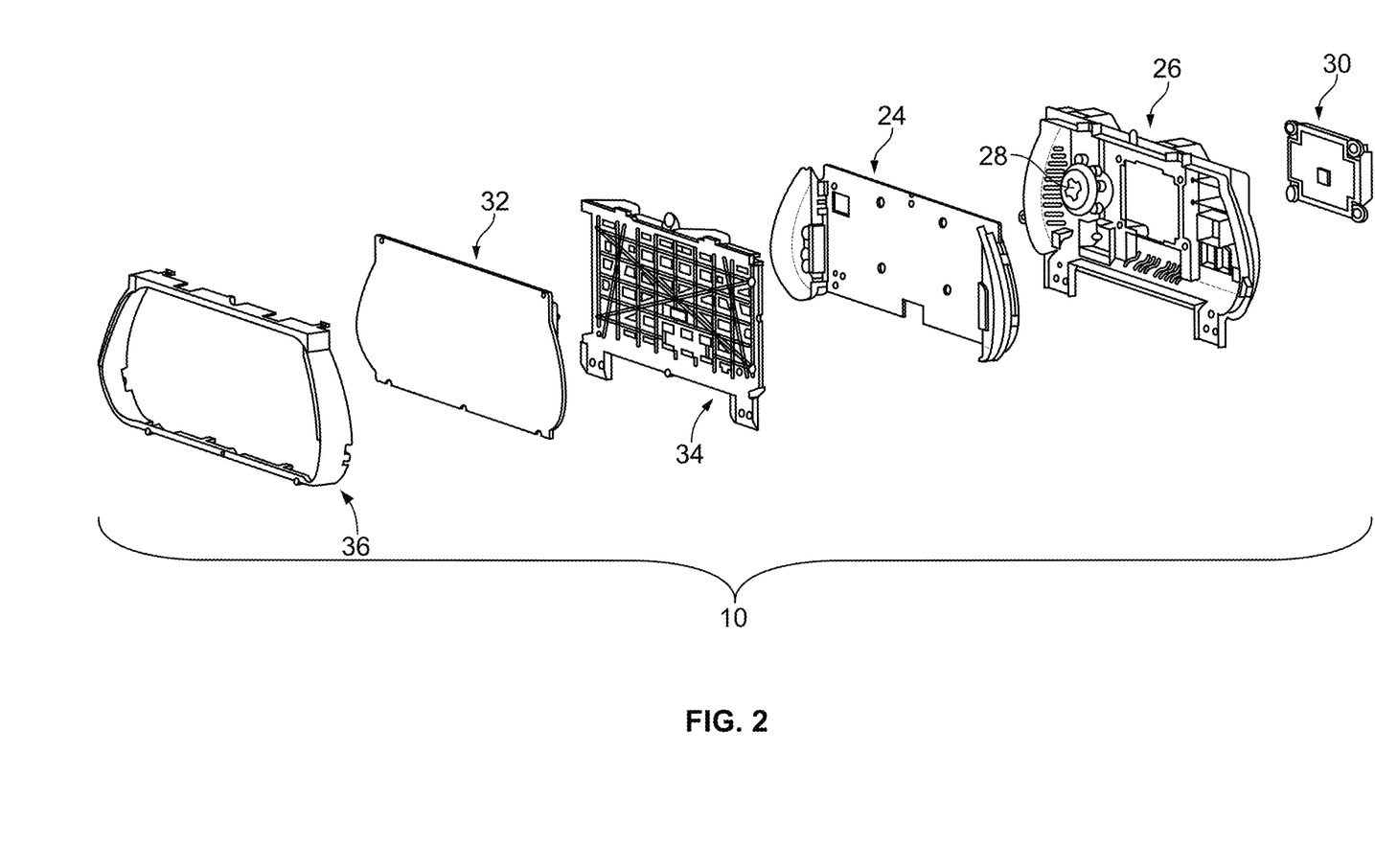
FIG. 2 is a perspective, partially exploded view of the instrument cluster shown in FIG. 1.
Figure 3:
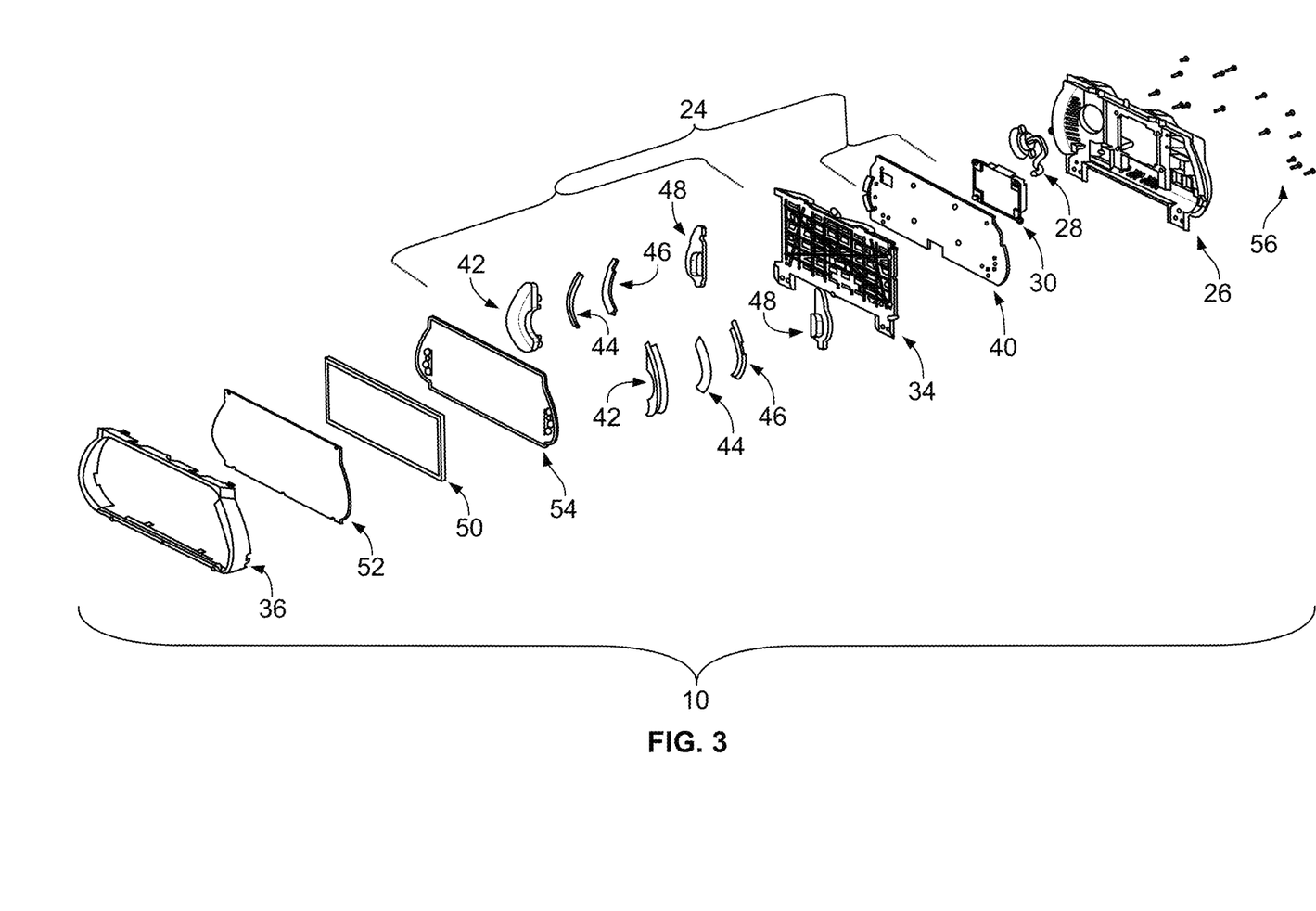
FIG. 3 is a perspective, exploded view that is similar to FIG. 2, but which shows further explosion of certain components of the instrument cluster.
Figure 4:
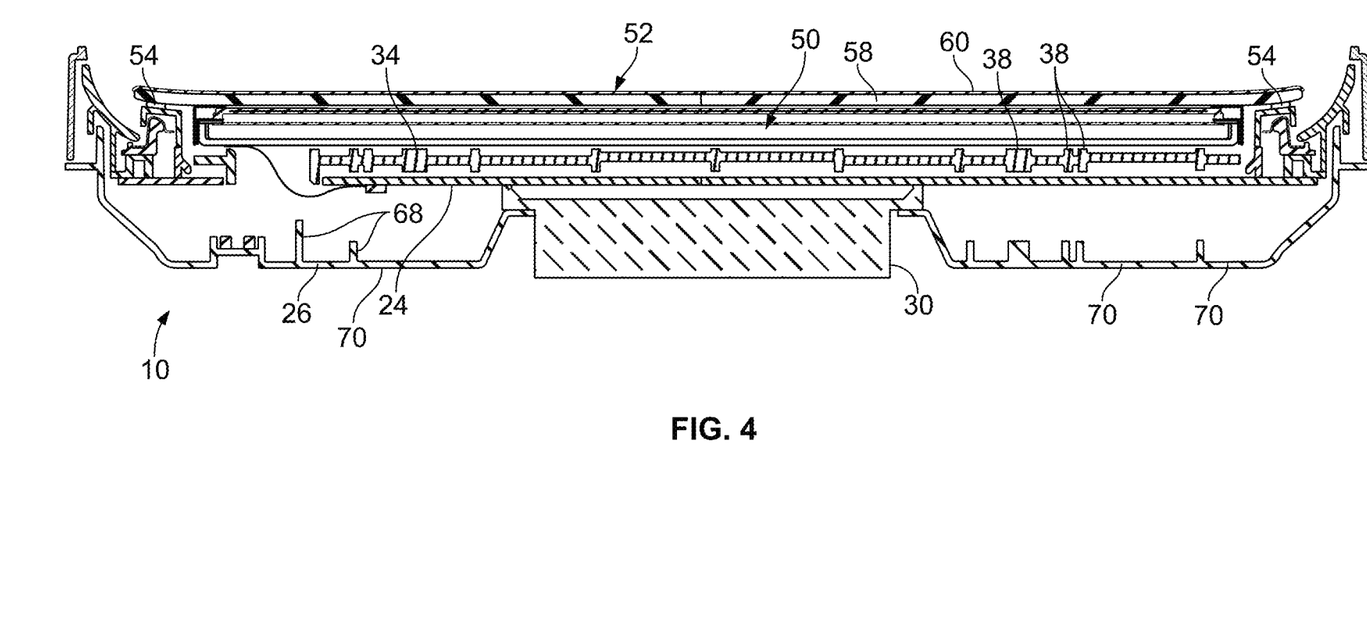
FIG. 4 is a cross-sectional view of the instrument cluster shown in FIG. 1, taken along line 4-4 of FIG. 1.

FIG. 2 is a perspective, partially exploded view of the instrument cluster 10 shown in FIG. 1, while FIG. 3 is a similar view, but shows further explosion of certain components of the instrument cluster 10. FIG. 4 is a cross-sectional view.

As shown in FIGS. 2 and 4, the instrument cluster 10 preferably comprises a printed circuit board ("PCB") and lighting structure assembly 24 that is mounted in an outer case or housing 26. As shown in FIGS. 2 and 3, an optional speaker 28 is disposed in the PCB and lighting structure assembly 24. As shown in FIG. 2-4, the instrument cluster 10 also includes one or more heat sinks 30 (preferably one, as shown), an optical bonding assembly 32, an inner frame 34, and an outer visor 36. Preferably, the heat sink 30 is comprised of aluminum or some other suitable material(s). Preferably, the outer case 26, the inner frame 34, and the outer visor 36 are formed of a polymer such as plastic. Preferably, the inner frame 34 provides reinforced ribs 38 (see FIG. 4) such as at locations of interface with other components of the instrument cluster 10.

As shown in FIGS. 3 and 4, the PCB and lighting structure assembly 24 preferably comprises a PCB assembly 40 as well as (one on each side of the PCB and lighting structure assembly 24): inner visors 42, halo diffusers 44, and light guides 46, as well as an inner case 48 that is formed of similar pieces on each side of the instrument cluster 10. Preferably, each of the inner visors 42, halo diffusers 44, light guides 46, and the inner case 48 (both components) is formed of plastic, and the PCB 40 includes LED's thereon for illumination of both TTs 18 and halo lighting 14 (see FIG. 1).

Regarding the optical bonding assembly 32, preferably the optical bonding assembly 32 comprises a thin-film-transistor ("TFT") 50, an in mold decorative lens or layer 52, and packing material 54, which is preferably a packing foam. Preferably, the instrument cluster 10 is held together using a plurality of fasteners 56 (the fasteners appear only in FIG. 3).

Preferably, the instrument cluster 10 is lens-less in that the instrument cluster 10 is not set back a distance from a curved lens that protects the instrument cluster 10. Instead, preferably the instrument cluster 10 is exposed and is touchable. Therefore, the instrument cluster 10 preferably includes the in mold decorative lens 52, and the in mold decorative lens 52 is preferably hard, resists scratching, is chemically resistant, and is configured to provide anti-glare/anti-reflection properties. Preferably, the in mold decorative lens 52 has a smoke tint. More specifically, preferably the in mold decorative lens 52 comprises a resin at its core, preferably a polymethyl methacrylate ("PMMA") surface 58, and has an opaque black printing or coating 60 on its outside surface (i.e., the surface facing the driver of the vehicle). Preferably, the resin 58 provides a 65% smoke tint while the coating 60 on the resin 58 provides a 15% smoke tint. The coating 60 provides the in mold decorative lens 52 with a black background area through which the TFT 50 can be viewed. The tinting design helps to provide the seamless appearance between the tell-tale surface 20 and the main display portion 22 at the borders 21. Regarding hardness, preferably the in mold decorative lens 52 provides an at least 2H level of hardness as a result of the hard coat layer 60 and the resin 58, wherein the in mold decorative lens 52 resists scratching and can be wiped clean and/or dry using a napkin or cloth.

Figure 5:
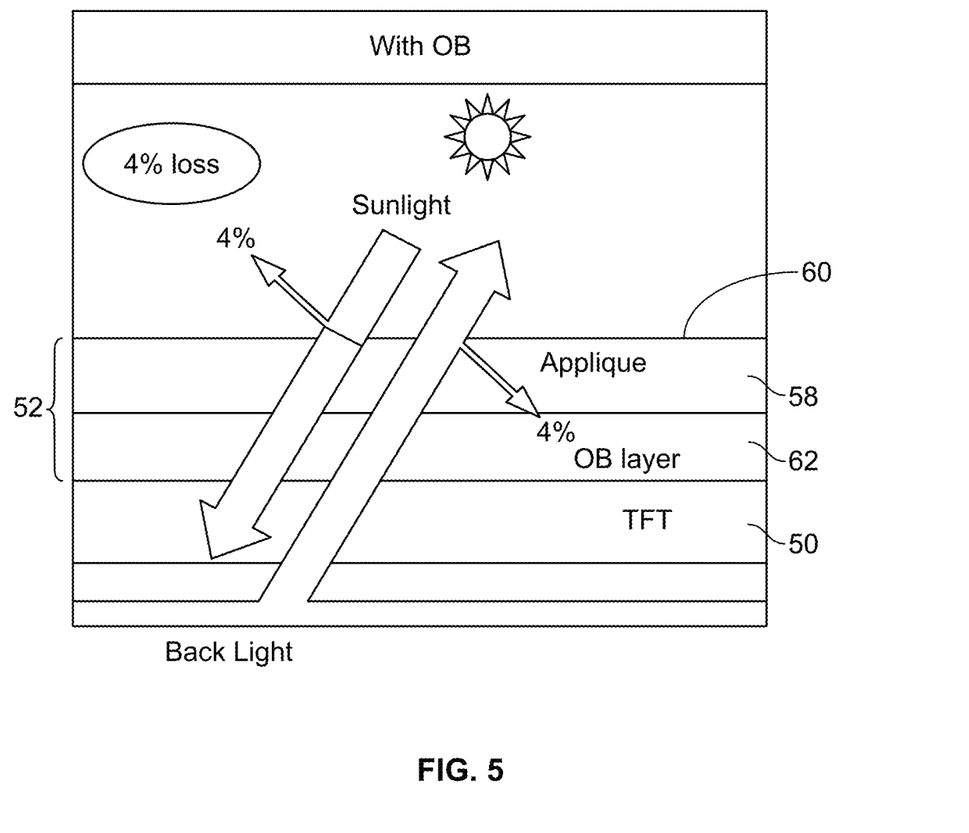
FIG. 5 is a cross-sectional view that shows an optically clear material in the instrument cluster functioning to reduce reflection.

As shown in FIG. 5, preferably instead of an air gap being provided between the in mold decorative lens 52 and the TFT 50, an optically clear material 62 is provided on the mold decorative lens 52, adjacent the TFT 50. The optically clear material 62 provides less refection of sunlight as well as less reflection of light that emanates from the TFT 50 compared to if an air gap were provided. The use of optically clear material 62 provides that the image being displayed on the TFT 50 is visually transposed up to the outer surface 60 of the in mold decorative lens 52. In other words, the perception of the display of the TFT 50 being lower than the in mold decorative lens 52 is lost. This visual perception results because there is no substantial change of medium between the TFT 50 and the in mold decorative lens 52. The combination of the coating 60 on the one side of the in mold decorative lens 52 and the optically clear material 62 on the opposite side of the in mold decorative lens 52 provides an anti-glare feature resulting in increased readability due to the reduction of sunlight reflection, and increased image brightness due to higher light efficiency.

Figure 6:
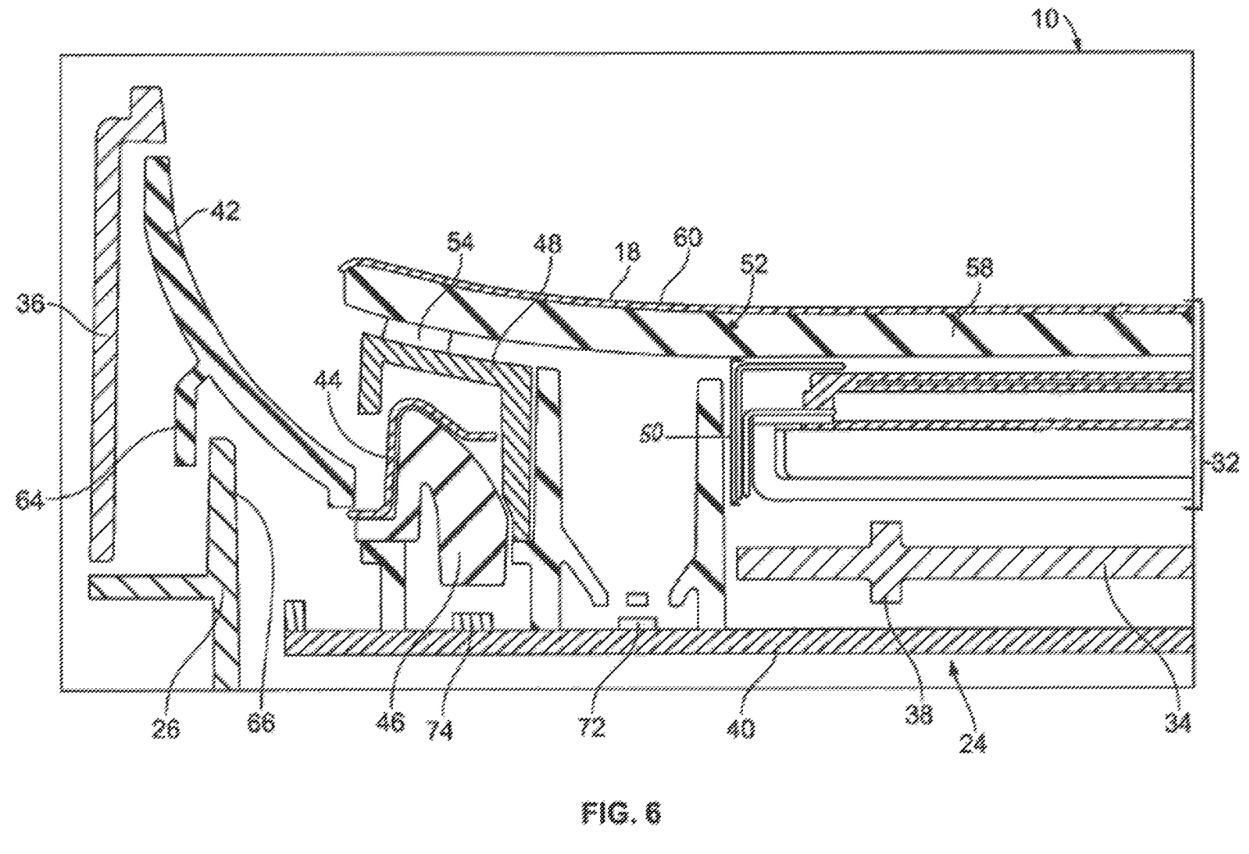
FIG. 6 is an enlarged view of a portion of that which is shown in FIG. 4.

As shown in FIG. 6, the instrument cluster 10 comprises a seal system to prevent the ingression of water and dust, especially toward the PCB and lighting structure assembly 24 and the optical bonding assembly 32 (which includes the TFT 50). This seal is provided as a result of the packing foam 54 being disposed between the in mold decorative lens 52 and each inner case component 48 (only one is shown in FIG. 6), and further sealing of the overall structure is provided as result of the abutment of different surfaces of the components shown in FIG. 6. For example, preferably there is a flange 64 proximate each end the inner visor 42 which engages a corresponding flange 66 on the outer case 26 to prevent entry of water, etc.

With regard to the packing foam 54, preferably water sealing foam that has a compression hardness of 0.25 N/cm2 for 50% compression is used such that the total force acting on the in mold decorative lens 52 is around 6.3 N which is negligible compared to the optical bonding force. Preferably, packing foam 54 is applied between the inner case 48 and the in mold decorative lens 52 between each TT 18, to prevent light leakage (i.e., to provide light meant to illuminate one TT from casting into another, adjacent TT).

In addition to the sealing, the instrument cluster 10 preferably has a drain hole design allowing moisture to escape from the overall assembly. Further to that end, as shown in FIG. 4, preferably the outer case 26 includes internal flanges 68 which tend to direct water down into drain holes (represented with reference numeral 70 in FIG. 4) for escape from the overall assembly.

Figure 7:
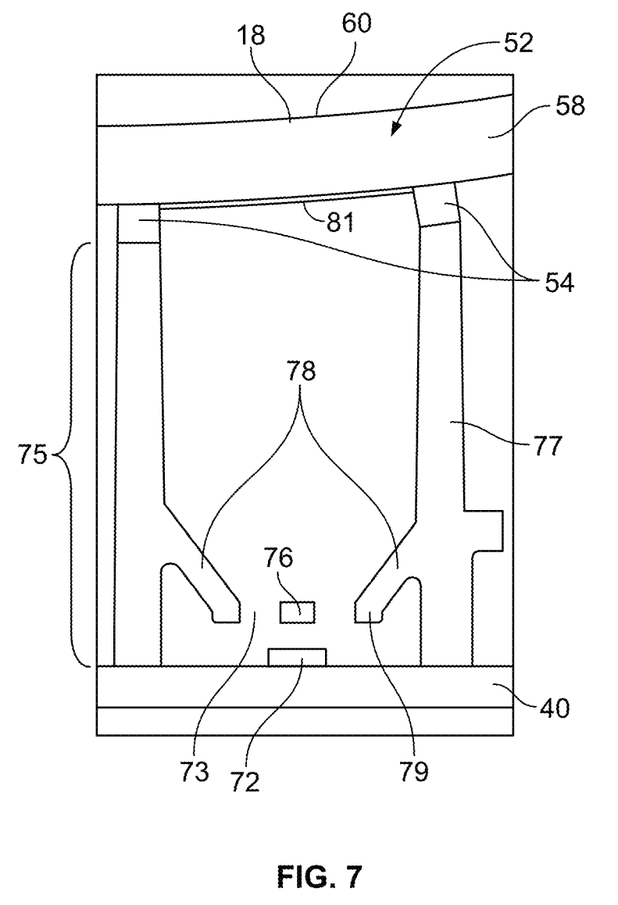
FIG. 7 is an enlarged view of a portion of FIG. 6, showing illumination of a TT, specifically a light blocking feature which functions to prevent the light being cast from the LED from travelling directly to the TT.
Figure 8:
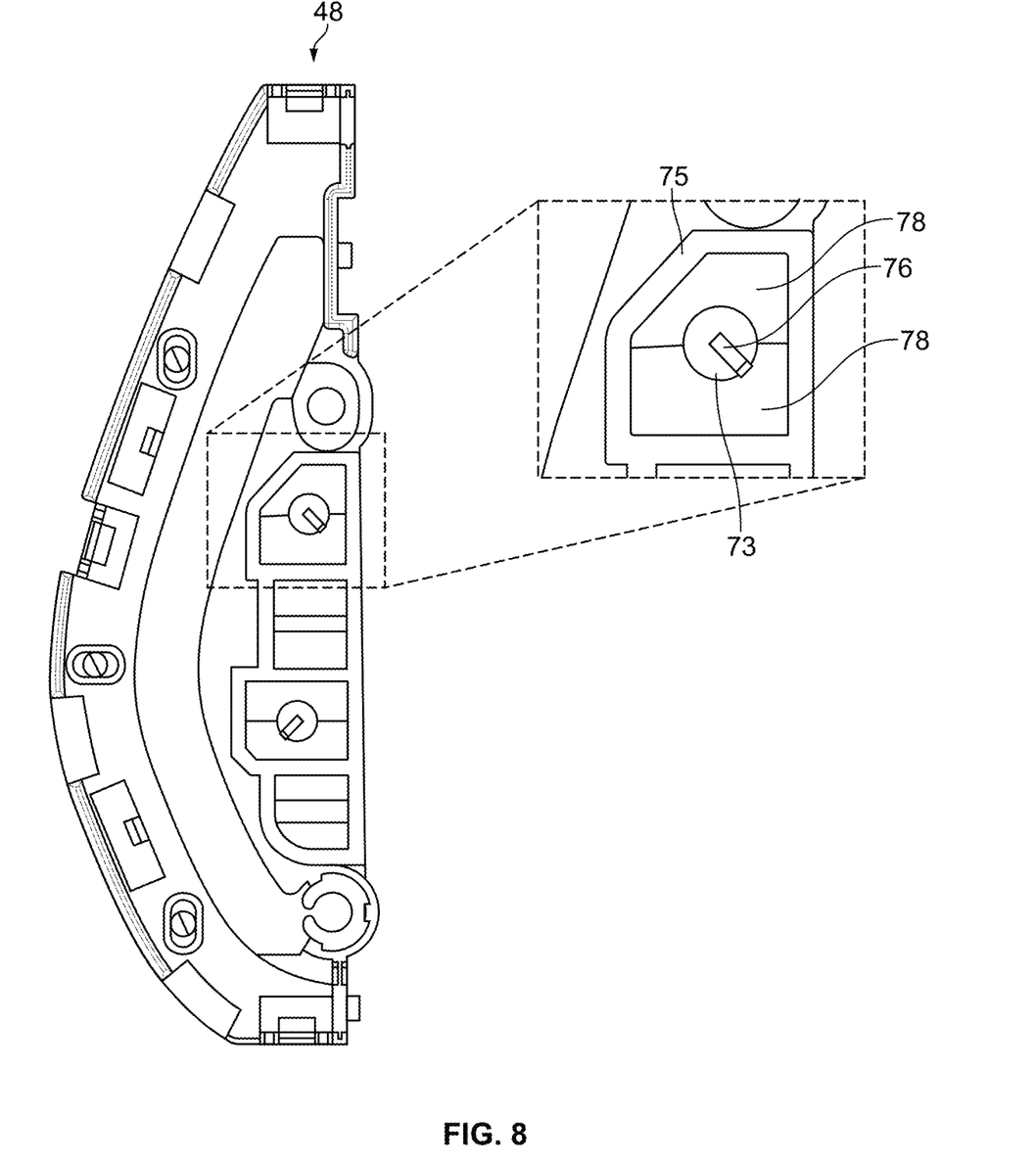
FIG. 8 shows one of the inner cases of the instrument cluster, and includes an enlarged view of a portion thereof.

As also shown in FIG. 6, the PCB provides LED's 72 (only one is shown in FIG. 6) that illuminate to provide lighting through a TT image 18 (in the form of a cut out in the printing or coating 60 on the outside surface of the in mold decorative lens 52). As shown in more detail in FIG. 7, preferably the inner case 48 provides a light blocking feature, such as light cup 75 comprising a rib 76 and conical portion 78, which functions to prevent the light being cast from the LED 72 from travelling directly to the TT 18. Instead, the illumination is dispersed generally over a larger area, an area that includes the TT 18, thereby preventing a hot spot that would otherwise appear in the TT 18. Preferably, a back side of the in mold decorative lens 52 includes textured surface 81 that also tends to eliminate any perceived hot spotting in the TT 18. As shown in FIG. 7, the conical portion 78 extends from walls 77 toward LED 72 at a preferably 35 degree angle. Terminal portion 79 of the conical portion 78 defines an opening 73 that is preferably 4.2 millimeters in diameter. FIG. 8 shows one of the inner case components 48 of the instrument cluster 10, and shows a portion thereof enlarged so the light cup 75 can be readily seen. As shown, the rib 76 preferably extends horizontally from the terminal portion 79 toward a center of the opening 73.

The TFT 50 could be, for example, a large, 10.25-inch-wide display. As will be appreciated by those of skill in the art, other widths and dimensions are contemplated for the purpose of adaptation and fit to specific uses. This display is seamless relative to TTs 18 (that may or may not illuminate depending on the current state of the vehicle). Preferably, the contrast difference between the display emanating from the TFT 50 and the illuminated TTs 18 is minimal and the illumination performance is similar.

With regard to the halo lighting 14 that is preferably provided on both sides of the instrument cluster 10, preferably the halo lighting 14 provides red-blue-green ("RGB") color capability and is configured to be adjusted with regard to not only the color, but also intensity and propagation. The halo lighting 14 may be configured to provide a highway pilot lighting mode for vehicles that have autonomous driving. Halo lighting 14 may also provide ambient lighting for aesthetic purposes, such as an orange halo illumination. As shown in FIG. 1, the halo lighting 14 may generally propagate in a generally c-shaped or curved configuration around each side of cluster 10. It is contemplated that other propagation configurations and shapes for halo lighting 14 may be deployed in alternative clusters 10.

Figure 9:
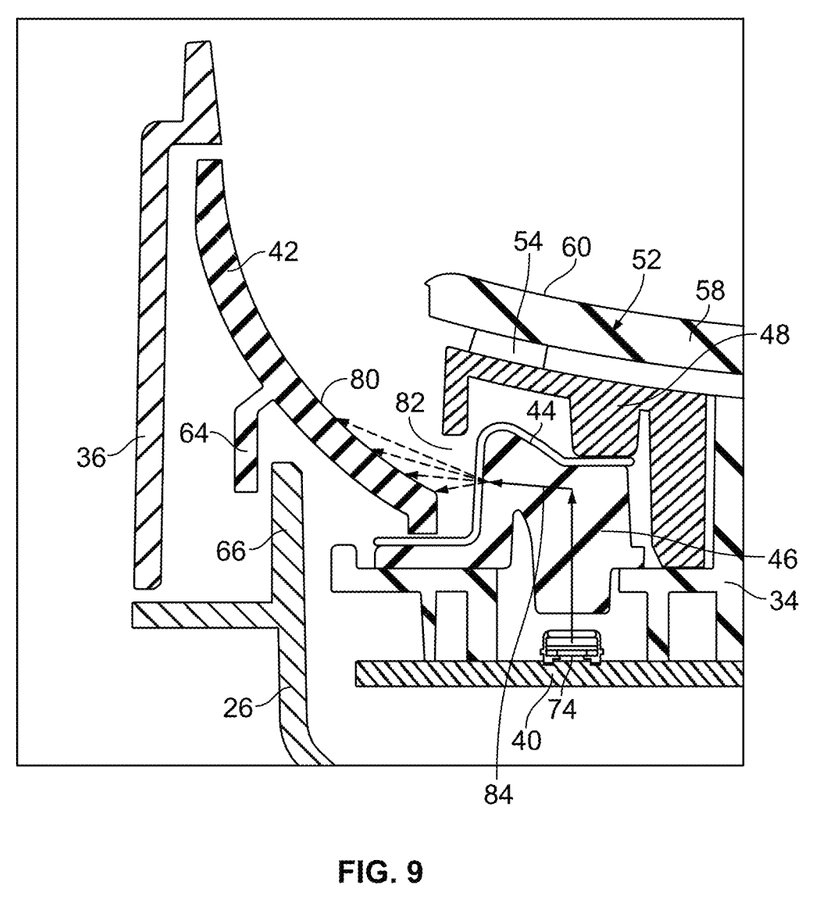
FIG. 9 is an enlarged view of a portion of FIG. 6, specifically one of the end portions thereof, showing how highway assist halo lighting is achieved.

FIG. 9 provides an enlarged cross-sectional view of one of the end portions of the instrument cluster 10, showing how halo lighting 14 is achieved on each side of the instrument cluster 10. Preferably, halo lighting 14 is achieved via light channeling. As shown, preferably the light guide 46 is disposed over one or more LED's 74 of the PCB 40 such that light emitted from the one or more LED's 74 is directed toward the inner visor 42 (i.e., on path 84) which preferably has a curved surface 80 which disperses the light along the edge of the instrument cluster 10. To provide a desired level of fading propagation for the halo lighting 14, a specific sized gap 82 between the inner case 48 and the inner visor 42 can be selected. In preferred embodiments, the gap 82 width is between 2.0 to 5.0 millimeters. Additionally, the width of gap 82 may be tapered. For example, the gap 82 width may increase as it extends from a top edge of display 12 toward an outer edge of display 12 to provide a smooth transition from bright to dark portions of the halo lighting 14. The combination of the profile of the light guide 46 and the curvature of the inner visor 42 works to achieve uniform halo propagation. Halo lighting 14 is preferably employed on both sides of the instrument cluster 10, and is preferably adjustable regarding color and intensity. As such, preferably the instrument cluster 10 provides an integrated package wherein a single PCB 40 provides both hard TT LED's and halo illumination via a plurality of LED's 72, 74.

Figure 10:
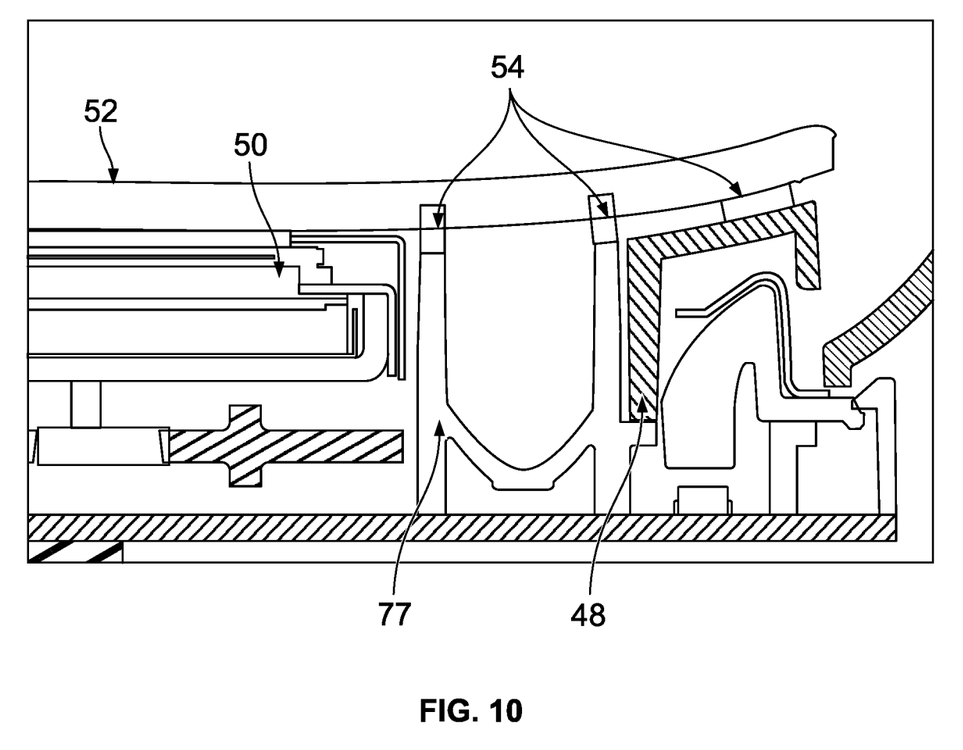
FIG. 10 is an enlarged cross-sectional view of a portion of FIG. 6, wherein packing material is shown between the inner case and the optical assembly of the instrument cluster.

FIG. 10 shows a cross-sectional view of a portion of instrument cluster 10, wherein packing foam 54 is preferably and strategically positioned at one or more locations between in mold decorative lens or layer 52 and an inner case 48. "Black-mura" is a two-tone effect created on prior art TFT displays seen during a lit condition. When pressure is applied to prior art TFTs, such as by way of a user's finger, it causes misalignment of liquid crystals in the TFT and creates a phase change of the backlight. This light is not blocked by the top polarizer and is leaked, causing the "mura" effect. Therefore, the design of the instrument cluster 10 addresses this issue via preferable, variable, and strategic positioning of a force absorbent material between components of the cluster 10 to ensure problematic loading is not applied on the TFT.

As explained above, the cluster 10 comprises optical bonding assembly 32, wherein the IMD layer 52 interacts with the TFT 50 to provide a "floating display" look. The optical bonding assembly 32 interfaces with multiple parts of the cluster 10 such as inner frame 34, inner visor 42, inner case 48, and/or walls 77. Such an interface raises stack-up concerns in the absence of consideration of, for example, a force absorbent material or other mechanism used to address the pressure applied to the layer 52. For example, with the stack-up, if the inner case 48 and inner visor 42 were allowed to directly interface with the optical bonding assembly 32 with hard-to-hard contact, the optical bonding assembly 32 could experience an over-constrained condition that exerts force on the TFT 50 and could lead to black-mura. To address this possibility, the packing foam 54, which is primarily added to provide a water sealing interface, may optionally play a key role in absorbing the stack-up forces and preventing over-constraint of the TFT 50.

The selected packing foam 54 preferably have a nominal thickness of 3 mm. For effective water sealing, the packing foam 54 should be compressed by 50% (to 1.5 mm). The thicknesses and compression ration of the foam 54 or similar force absorbent material may vary. However, if the packing material 54 has a compressive force that is too large, this force can migrate to the optical bonding assembly 32 and consequently the TFT 50. Therefore, preferable packing materials 54 exist to mitigate the incidence of black-mura on the TFT, while also providing water sealing capabilities. Tested materials 54 in cluster 10 include Nitto 6800 having a compression hardness of approximately 8 N/cm$^2$ (newtons per square centimeter) at 50% compression, and EC-100 having a compression hardness of approximately 0.25 N/cm$^2$ at 50% compression. Both exemplary materials 54 are made by Nitto Denko Corporation, but use of many alternative packing materials is envisioned. Material 54 and its attendant compression hardness range may vary, depending on the structure of cluster 10.

Accordingly, the lensless instrument cluster 10 may further comprise a compression system to prevent mura from occurring in the TFT 50 due to pressure applied to the TFT, the compression system comprising the packing material 54 preferably being disposed between the in mold decorative lens 52 and the inner case 48. In a preferred embodiment, the packing material 54 has resultant force of preferably up to 10 N under 50% compression, and more preferably 8-10 N under 50% compression. Other packing material 54 having a higher resultant force under 50% compression may be used, but such may increase the probability of mura in the TFT absent other modifications to the design. Further, it is envisioned that a wide array of packing materials 54 having different compression hardnesses may be used, so long as the materials achieve the preferred resultant force under 50% compression.

The instrument cluster 10 provides a lens-less, seamless design, wherein TTs 18 and a main display 22 are effectively integrated using, preferably, a single PCB 40. The instrument cluster 10 is robust, is designed to provide anti-glare properties, and its internal components are effectively sealed from water and dust. The outer surface provides hardness yet resists scratching and can be wiped clean/dry using a napkin or cloth. The instrument cluster 10 provides attractive, preferably adjustable, halo lighting 14.

As defined herein, the "outermost surface" of display 12 designates the surface of the display 12 that is directly exposed to an external environment and capable of being directly contacted by a user during normal operation. For example, the external environment may be a user environment where the instrument cluster 10 is installed, such as the cabin of a vehicle. Preferred embodiments of display 12 comprise in mold decorative lens or layer 52 having coating 60 as the outermost surface. This is just one example of a preferred embodiment, and one of ordinary skill in the art will appreciate that the outermost surface is dependent on the preferred composition of the display 12.

As defined herein, "lens-less" refers to the absence of a protective cover or shield found in traditional instrument clusters. In traditional systems, the protective shield and the display surface of the cluster define a void between the shield and the display surface. There is no such void defined by preferred embodiments of the present invention. As described herein, the in mold decorative "lens" 52 is preferably integral with the display 12.

While a specific embodiment of the invention has been shown and described, it is envisioned that those skilled in the art may devise various modifications without departing from the spirit and scope of the present invention.

The invention claimed is:

1. A lensless instrument cluster configured for installation in a user environment, the lensless instrument cluster comprising:
   an outer case;
   a printed circuit board and lighting structure assembly connected to the outer case;
   an inner frame connected to the printed circuit board and lighting structure assembly;
   an optical bonding assembly connected to the inner frame;
   a halo lighting portion;
   a seamless display comprising:
     a main display portion comprising a gauge;
     a tell-tale surface comprising a tell-tale indicator; and
     an outermost surface that is in direct contact with the user environment;
   a compression system disposed between the optical bonding assembly and the printed circuit board and lighting structure assembly, wherein the compression system is configured to prevent mura from occurring in the optical bonding assembly due to pressure applied to the optical bonding assembly.

2. The lensless instrument cluster of claim 1, further comprising an outer visor connected to the optical bonding assembly.

3. The lensless instrument cluster of claim 1, wherein the printed circuit board and lighting structure assembly comprises a first light emitting diode configured to illuminate the tell-tale indicator and a second light emitting diode configured to illuminate the halo lighting portion.

4. The lensless instrument cluster of claim 3, wherein the optical bonding assembly comprises a thin-film-transistor, an in mold decorative layer, and a packing material.

5. The lensless instrument cluster of claim 4, wherein the printed circuit board and lighting structure assembly further comprises an inner case and an inner visor, and the compression system comprises the packing material, wherein the packing material is disposed between the in mold decorative layer and the inner case, and wherein the packing material is configured to prevent mura from occurring in the thin-film-transistor due to pressure applied to the thin-film-transistor.

6. The lensless instrument cluster of claim 1, wherein the printed circuit board and lighting structure assembly comprises an inner case and a light emitting diode configured to illuminate the tell-tale indicator, and wherein the inner case comprises a light blocking feature that is configured to provide an indirect illumination of the tell-tale indicator by the light emitting diode.

7. The lensless instrument cluster of claim 6, wherein the light blocking feature is a light cup.

8. The lensless instrument cluster of claim 1, wherein the printed circuit board and lighting structure assembly comprises an inner visor, a light guide, and a light emitting diode configured to illuminate the halo lighting portion, wherein the light guide is disposed over the light emitting diode such that light emitted from the light emitting diode is directed on a path toward the inner visor.

9. The lensless instrument cluster of claim 8, wherein the printed circuit board and lighting structure assembly further comprises an inner case, wherein the inner visor has a curved surface, and wherein the inner case and the inner visor define a gap having a width.

10. The lensless instrument cluster of claim 9, wherein the width of the gap is tapered.

11. A lensless instrument cluster comprising:
an outer case comprising a heat sink;
a printed circuit board and lighting structure assembly connected to the outer case and comprising:
　a first light emitting diode configured to illuminate a tell-tale indicator;
　a second light emitting diode configured to illuminate a halo lighting portion;
an inner frame connected to the printed circuit board and lighting structure assembly;
an optical bonding assembly connected to the inner frame and comprising:
　a thin-film-transistor;
　an in mold decorative lens;
　an inner case; and
　a packing material;
the halo lighting portion;
a seamless display comprising:
　a main display portion; and
　a tell-tale surface;
a compression system configured to prevent mura from occurring in the thin-film-transistor due to pressure applied to the thin-film-transistor, the compression system comprising the packing material being disposed between the in mold decorative lens and the inner case.

12. The lensless instrument cluster of claim 11, wherein the inner case comprises a light blocking feature that is configured to provide an indirect illumination of the tell-tale indicator by the first light emitting diode.

13. The lensless instrument cluster of claim 12, wherein the light blocking feature is a light cup comprising a conical portion, a rib, and a textured surface.

14. The lensless instrument cluster of claim 11, wherein the printed circuit board and lighting structure assembly further comprises an inner visor and a light guide, wherein the light guide is disposed over the second light emitting diode such that light emitted from the second light emitting diode is directed on a path toward the inner visor, thereby providing an indirect light at the halo lighting portion.

15. The lensless instrument cluster of claim 14, wherein the inner visor has a curved surface, and wherein the inner case and the inner visor define a gap having a tapered width.

16. The lensless instrument cluster of claim 11, wherein the tell-tale surface comprises a plurality of tell-tale indicators, and wherein the packing material is further disposed between the in mold decorative lens and the inner case between each of the plurality of tell-tale indicators to prevent light cast by the first light emitting diode from illuminating more than one of the plurality of tell-tale indicators.

17. The lensless instrument cluster of claim 11, wherein the lensless instrument cluster is configured for installation in a user environment, and the seamless display further comprises an outermost surface that is in direct contact with the user environment.

18. The lensless instrument cluster of claim 11, wherein the printed circuit board and lighting structure assembly further comprises an inner visor, and wherein lensless instrument cluster comprises a seal system to prevent the ingress of water and dust into printed circuit board and lighting structure, the seal system comprising:
　the packing material being further disposed between the in mold decorative lens and the inner case;
　a first flange disposed on the inner visor that is correspondingly engaged with a second flange disposed on the outer case; and
　a third flange disposed on the outer case that directs water into a drain hole defined by the outer case.

19. The lensless instrument cluster of claim 11, wherein the printed circuit board and lighting structure assembly further comprises inner visor.

20. The lensless instrument cluster of claim 11, wherein the packing material is a packing foam that has a resultant force of up to 10 newtons at 50% compression of the packing material.

* * * * *